United States Patent
Harvey et al.

(10) Patent No.: US 8,651,664 B2
(45) Date of Patent: Feb. 18, 2014

(54) AIRCRAFT PROJECTOR SYSTEM AND MOVEMENT DETECTION SYSTEM RESPONSIVE TO AIRCRAFT STRUCTURE MOVEMENT

(75) Inventors: Eric Joseph Harvey, Seattle, WA (US); Ty Aaby Larsen, Everett, WA (US); Richard A. Cote, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 230 days.

(21) Appl. No.: 13/169,984

(22) Filed: Jun. 27, 2011

(65) Prior Publication Data

US 2012/0327378 A1 Dec. 27, 2012

(51) Int. Cl.
*G03B 21/00* (2006.01)
*G09B 25/00* (2006.01)
*B64C 1/00* (2006.01)
*B64C 30/00* (2006.01)

(52) U.S. Cl.
USPC ........ 353/13; 244/117 R; 244/129.1; 434/372

(58) Field of Classification Search
USPC ....... 353/12–14; 244/117 R, 119, 123.1, 126, 244/129.1; 434/372
See application file for complete search history.

(56) References Cited

U.S. PATENT DOCUMENTS

| | | | |
|---|---|---|---|
| 1,695,078 A * | 12/1928 | Barker | 40/212 |
| 1,727,095 A * | 9/1929 | Bleriot | 40/215 |
| 1,999,479 A * | 4/1935 | Reder | 353/13 |
| 5,113,079 A * | 5/1992 | Matulka | 250/550 |
| 5,570,138 A * | 10/1996 | Baron | 348/744 |
| 5,724,161 A | 3/1998 | Smith et al. | |
| 6,405,975 B1 * | 6/2002 | Sankrithi et al. | 244/1 R |
| 6,898,517 B1 | 5/2005 | Froeberg | |
| 7,136,030 B2 * | 11/2006 | Steed et al. | 345/7 |
| 7,339,730 B2 * | 3/2008 | Brodsky et al. | 359/409 |
| 8,091,822 B2 * | 1/2012 | Boyce | 244/13 |
| 8,157,383 B2 * | 4/2012 | Scanlon | 353/13 |
| 2002/0171927 A1 * | 11/2002 | Barnes, III | 359/451 |
| 2003/0038928 A1 * | 2/2003 | Alden | 353/122 |
| 2005/0082262 A1 * | 4/2005 | Rueb et al. | 219/121.6 |
| 2005/0209744 A1 | 9/2005 | Ihbe et al. | |
| 2006/0223009 A1 * | 10/2006 | Barr et al. | 430/311 |
| 2008/0047176 A1 * | 2/2008 | Thiele et al. | 40/212 |
| 2009/0002644 A1 * | 1/2009 | Christensen et al. | 353/85 |
| 2009/0195753 A1 * | 8/2009 | Dill et al. | 353/28 |
| 2009/0257070 A1 * | 10/2009 | Baird et al. | 358/1.5 |
| 2010/0036717 A1 | 2/2010 | Trest | |
| 2010/0060730 A1 * | 3/2010 | Poussin et al. | 348/115 |
| 2010/0079729 A1 * | 4/2010 | Scanlon | 353/13 |

(Continued)

OTHER PUBLICATIONS

Buckley, "Holographic Laser Projection Technology", Journal of Display Technology, 2010, pp. 1-4. Retrieved on Jun. 27, 2011. http://ieeexplore.ieee.org/stamp.jsp?tp=&arnumber=5475362.

(Continued)

*Primary Examiner* — Tony Ko
*Assistant Examiner* — Jori S Reilly-Diakun
(74) *Attorney, Agent, or Firm* — Yee & Associates, P.C.

(57) ABSTRACT

A method and apparatus comprising a projector system and a structure connected to the projector system. The projector system is configured to project an image on an exterior surface of an aircraft. The structure is configured to be connected to the aircraft and has a shape configured to reduce an undesired airflow caused by the projector system when the aircraft is in flight.

20 Claims, 12 Drawing Sheets

(56) References Cited

U.S. PATENT DOCUMENTS

| | | | |
|---|---|---|---|
| 2011/0032484 A1 | 2/2011 | Seal | |
| 2011/0147528 A1* | 6/2011 | Adarve Lozano | 244/135 A |
| 2011/0188257 A1* | 8/2011 | Sidler | 362/470 |
| 2012/0212712 A1* | 8/2012 | Scanlon | 353/121 |
| 2012/0253698 A1* | 10/2012 | Cokonaj | 702/39 |

OTHER PUBLICATIONS

"Light Blue Optics", Light Blue Optics, pp. 1-2. Retrieved on Jun. 27, 2011. http://lightblueoptics.com/.

"avproworldwide: projected lighting", avproworldwide, pp. 1-3. Retrieved on Jun. 27, 2011. http://www.avproworldwide.com/lights.html.

"Types of Billboards", startupbizhub, pp. 1-2. Retrieved on Jun. 27, 2011. http://www.startupbizhub.com/types-of-billboards.htm.

"Digital Billboards", BillboardConnection, pp. 1-3. Retrieved on Jun. 27, 2011. http://www.billboardconnection-kendall.com/digitalbillboard.

Garrettson, "Exterior Aircraft Display System," U.S. Appl. No. 13/603,040, filed Sep. 4, 2012, 68 pages.

* cited by examiner

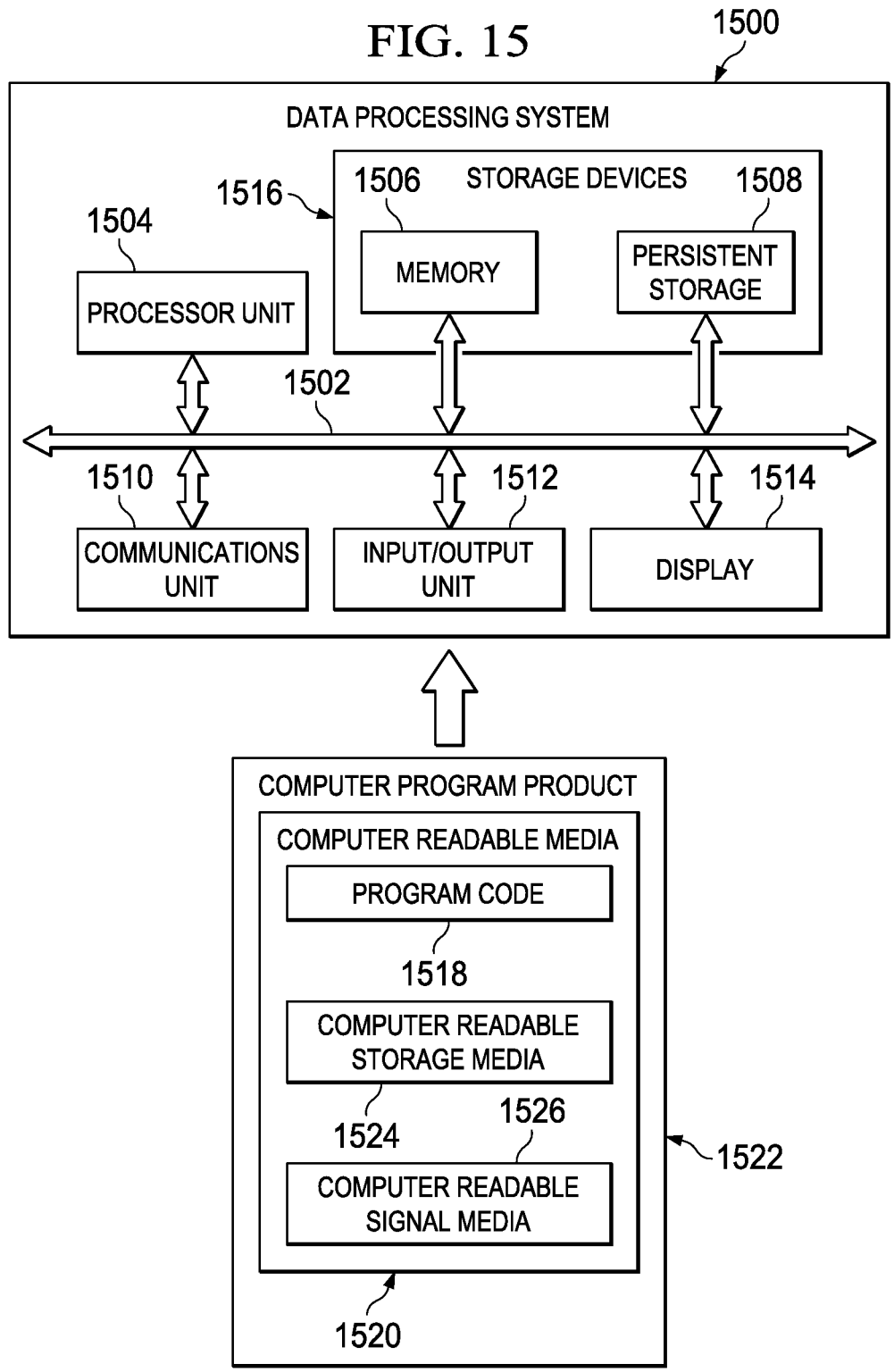

AIRCRAFT PROJECTOR SYSTEM AND MOVEMENT DETECTION SYSTEM RESPONSIVE TO AIRCRAFT STRUCTURE MOVEMENT

BACKGROUND INFORMATION

1. Field:

The present disclosure relates generally to vehicles and, in particular, to the display of information on vehicles. Still more particularly, the present disclosure relates to a method and apparatus for displaying information in a dynamic manner on an aircraft.

2. Background:

Advertisements and other messages are typically placed in advertising spaces in fixed locations. Advertisements are commonly found on billboards, buildings, and other structures. Advertisers have included other systems for increasing the visibility of advertisements and other messages.

For example, advertisements are often placed on moving vehicles. These vehicles include buses, taxicabs, airplanes, and other suitable types of vehicles. In some cases, trucks have been used solely for the purpose of acting as a mobile billboard. With advertisements on vehicles, these advertisements can be seen in many more areas than may otherwise be possible based on restrictions or costs for other more traditional types of advertisements.

Advertisements on vehicles are typically fixed and cannot be easily changed. As a result, as a vehicle moves to different locations, the advertisements may not be as effective for the particular audience that may view the advertisement in those locations.

In some cases, the advertisement may be changed on a fixed schedule. For example, a truck that is designed for advertising may have sides that rotate to provide a different advertisement at some fixed point in time. These advertisements may be changed periodically but still may not provide as much flexibility as desired.

Therefore, it would be advantageous to have a method and apparatus that takes into account at least some of the issues discussed above, as well as possibly other issues.

SUMMARY

In one advantageous embodiment, an apparatus comprises a projector system and a structure connected to the projector system. The projector system is configured to project an image on an exterior surface of an aircraft. The structure is configured to be connected to the aircraft and has a shape configured to reduce an undesired airflow caused by the projector system when the aircraft is in flight.

In another advantageous embodiment, an information projector system comprises a projector and a computer system. The laser projector is configured to display a number of images on an exterior surface of an aircraft during any phase of operation. The computer system is in communication with the projector. The computer system is configured to select the number of the images and control operation of the projector.

In yet another advantageous embodiment, a method A method for displaying information on an exterior surface of an aircraft is provided. An image is projected using a display unit connected to a structure, wherein the image is capable of being projected on the exterior surface of the aircraft during any phase of operation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 15 is an illustration of a data processing system in accordance with an advantageous embodiment.

DETAILED DESCRIPTION

Figure 1:
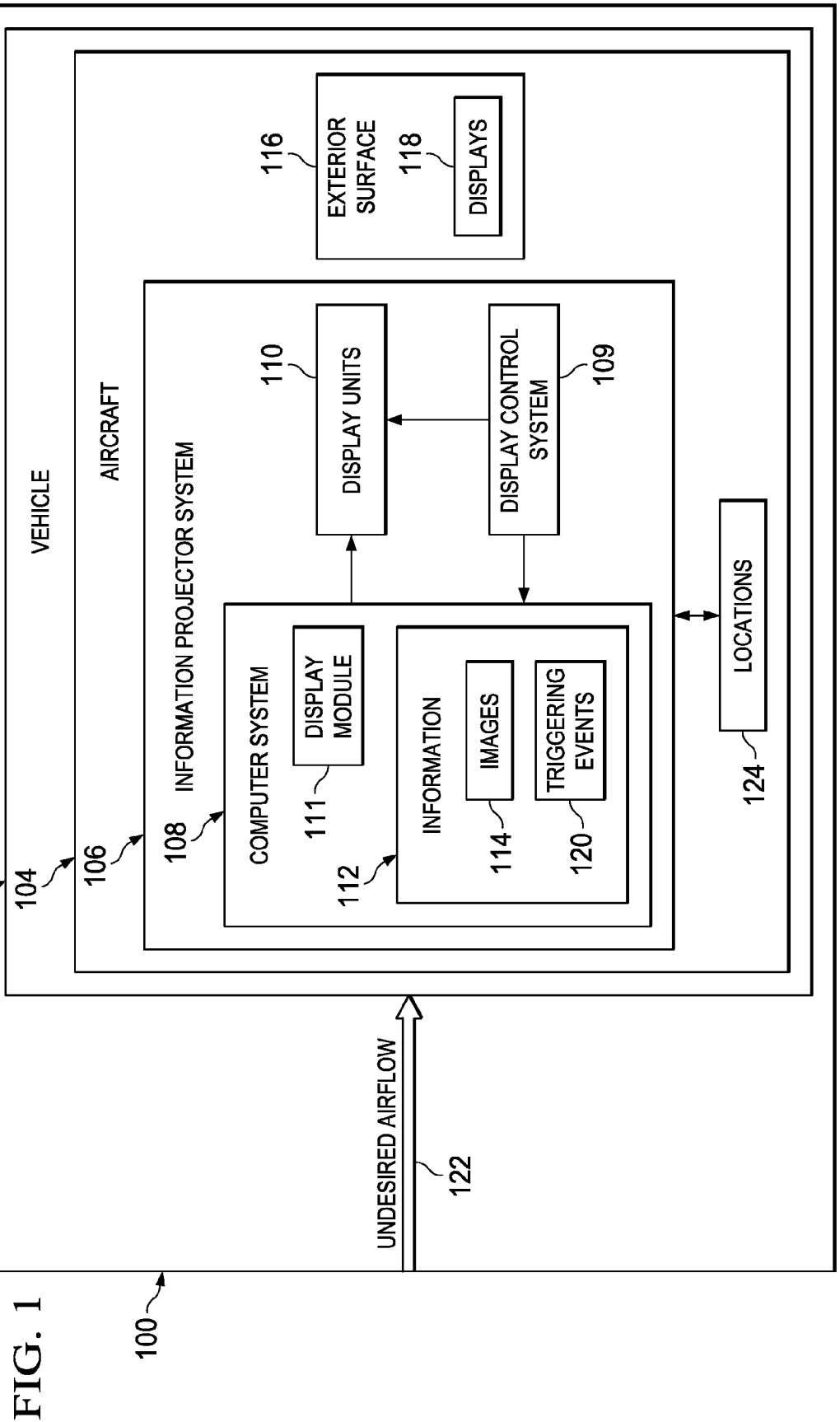
FIG. 1 is an illustration of an information display environment in accordance with an advantageous embodiment.

The different advantageous embodiments recognize and take into account a number of different considerations. A number, as used herein when used with reference to items, means one or more items. For example, "a number of different considerations" is one or more different considerations.

The different advantageous embodiments recognize and take into account that one manner in which more dynamic displays may be provided involves using liquid crystal display (LCD) devices. These types of display devices may be programmed to change their display in a more desirable fashion. For example, the display may be changed to provide an advertisement or information that is tailored to specific locations. These types of displays may be more useful for placement inside a vehicle than on the outside.

The different advantageous embodiments recognize and take into account that liquid crystal displays may not provide as wide a viewing area as desired. Additionally, liquid crystal display devices may not be as thin as desired.

The different advantageous embodiments recognize and take into account that an organic light emitting diode (OLED) display is another type of display device that may be more suitable for use on the exterior of a vehicle. Organic light emitting diode displays may be constructed in a manner that is much thinner than a liquid crystal display device. Further, these types of displays may be manufactured on films that may be flexible. Further, these types of displays may function without a backlight.

The different advantageous embodiments recognize and take into account, however, that organic light emitting diode displays may not be as desirable for use on the exterior of an aircraft. Securing this type of display to the exterior of an aircraft may be more time consuming and expensive than desired. Further, these types of displays may be subject to impact with debris and other types of objects which may require maintenance for the displays. Additionally, the different advantageous embodiments recognize and take into account that the addition of this type of display to the exterior of an aircraft may increase drag by more than a desirable amount.

The different advantageous embodiments also recognize and take into account that this type of display also may add more weight than desired. The increased weight may result in an undesired reduction in fuel efficiency for the aircraft. As a result, the cost to operate the aircraft may be increased with the use of this type of display.

Thus, the different advantageous embodiments provide a method and apparatus for displaying information on the exterior surface of a vehicle, such as an aircraft. In one advantageous embodiment, an apparatus comprises a projector system and a structure connected to the projector system. The projector system is configured to project an image on an exterior surface of an aircraft. The structure is configured to be connected to the aircraft and may have a shape configured to reduce any undesired airflow and aerodynamic drag caused by the projector system when the aircraft is in flight.

With reference now to FIG. 1, an illustration of an information display environment is depicted in accordance with an advantageous embodiment. In this illustrative example, an information display environment 100 includes a vehicle 102 in the form of an aircraft 104.

An information projector system 106 is associated with the aircraft 104. In these illustrative examples, the information projector system 106 may comprise a computer system 108, a display control system 109, and display units 110.

The computer system 108 is configured to interface with the different systems on the aircraft. The computer system 108 comprises a number of computers and is located in the aircraft 104. The computer system 108 is in communication with the information projector system 106. A display module 111 in the computer system 108 may receive and/or generate information 112 used to form displays 118 of images 114 on an exterior surface 116 of the aircraft 104. The display module 111 may be hardware, software, or a combination of the two.

The communication between the computer system 108 and the information projector system 106 may be over existing communication links established over different types of media. These media may include wire, wireless communications links, fiber optic cables, and other suitable media. The communications links may be unidirectional, bidirectional, or a combination of the two.

The information 112 may be at least one of a logo, a trademark, an advertisement, a warning, data from sensors on the aircraft 104, maintenance information, a message, a tail number, marketing information, safety information, and other desired forms of the information 112.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C, In other examples, "at least one of" may be, for example, without limitation, two of item A, one of item B, and 10 of item C; four of item B and seven of item C; and other suitable combinations.

In the illustrative examples, the information 112 may come from different sources onboard the aircraft 104 and/or off of the aircraft 104. For example, the information 112 may include information about the airport, city, and/or events in the city in which the airport is located. Information from the aircraft 104 may include at least one of fuel levels, direction of travel of the aircraft 104, and/or other suitable information about the aircraft 104.

The images 114 are two-dimensional and/or three-dimensional pictures. The images 114 may be generated using the information 112 or may be the information 112. For example, an image in the images 114 may be generated by the display module 111 from a message or data from a sensor. In another example, the image may be a picture from a camera received as the information 112.

Further, the images 114 may be static images, dynamic images, or both. For example, without limitation, the images 114 may be still images, photographs, pictures, video, animations, three-dimensional images, holograms, and/or other suitable types of images.

One or more of the display units 110 project the images 114 onto the exterior surface 116 of the aircraft 104. This projection of the images 114 onto the exterior surface 116 of the aircraft 104 forms the displays 118 of the images 114.

In these illustrative examples, the display module 111 in the computer system 108 may be configured to control the displays 118 of the images 114 on the exterior surface 116. For example, the display module 111 may select the information 112 and/or the images 114 used to generate the displays 118, including which of the images 114 are projected onto the exterior surface 116 of the aircraft 104. The display module 111 also may control when and how the images 114 are projected onto the exterior surface 116 of the aircraft 104 by the number of the display units 110.

The computer system 108 may control the display of the images 114 on the exterior surface 116 of the aircraft 104 in a number of different ways. For example, the display of the images 114 may be controlled based on triggering events 120. The triggering events 120 may be periodic or non-periodic events and may be obtained using the information 112. In these illustrative examples, the triggering events 120 include any information that may be used by the computer system 108 to determine when, how, and where to display the images 114 on the displays 118 on the exterior surface 116 of the aircraft 104.

For example, the triggering events 120 may include an indication of the phase of flight of the aircraft 104. Based on the phase of flight, the computer system 108 may select one or more of the images 114 for use in the display of the images 114 on the exterior surface 116. As another example, if a message is received from the airport at which the aircraft 104 is located, that message may be used to generate an image in the images 114 for display on the exterior surface 116 of the aircraft 104. For example, the message may refer to a result of an athletic event that may be included in the images 114 that are displayed on the exterior surface 116.

Further, the triggering events 120 also may include an indication that the aircraft 104 is approaching an airport gate, beginning a taxiing phase, initiating engine start, initiating hydraulics pressurization, or other suitable information that may be used to select the images 114 for display on the exterior surface 116. The triggering events 120 also may include location specific information. This location information may be used to identify advertising, logos, and/or other suitable types of the information 112 that may be used to generate or select the images 114.

The number of the display units 110 are connected to the aircraft 104 in a manner that reduces undesired airflow 122 when the aircraft 104 is in flight. This undesired airflow 122 may result in an increase in aerodynamic drag. The number of the display units 110 in the information projector system 106 may project the information 112 in the images 114 onto locations 124 on the exterior surface 116 of the aircraft 104. The locations 124 may include, for example, without limitation, a vertical stabilizer, a fuselage, a wing, an engine, and/or other suitable structures on the aircraft 104. In some illustrative examples, the locations 124 also may include the ground and/or other objects around the aircraft 104.

The display control system 109 may provide safety and alignment functions within the information projector system 106. In these illustrative examples, the display control system 109 is in communication with the computer system 108 and the display units 110.

The display control system 109 may control the number of the display units 110 to increase eye safety. For example, when the number of the display units 110 includes coherent light, the display control system 109 may increase safety for people who may be around the aircraft 104. The display control system 109 may control the display units 110 to cease generating the displays 118 on the exterior surface 116 of the aircraft 104 when maintenance personnel are around the aircraft 104.

Further, the display control system 109 may cause the display units 110 to cease generating the displays 118 when the aircraft 104 is on the ground. For example, the display control system 109 may turn off power to the display units 110, send a command to the number of the display units 110 to turn off the coherent light sources, and/or cease generating the displays 118 in some other suitable manner.

As another example, the display control system 109 may include a sensor system that monitors for a presence of a person that is too close to one or more of the displays 118 generated by the display units 110. When this presence is detected, the display control system 109 may then control the display units 110 at which the presence of the person was detected to cease generating the displays 118.

As another example, the display control system 109 may change the intensity of the coherent light generated by the display units 110 when the aircraft 104 is on the ground as opposed to in the air. The intensity of the coherent light may be reduced to a level that may meet policies for exposure to coherent light.

Further, the display control system 109 may be used to align or provide a desired display of the images 114 in the displays 118 generated by the display units 110 on the exterior surface 116 of the aircraft 104. The alignment of the images 114 may be performed using any currently-used techniques for aligning or focusing the images 114.

With the alignment function, the display control system 109 may be able to automatically provide a focused image in a desired location in the locations 124 on the exterior surface 116 of the aircraft 104. As a result, time and effort needed by human operators to focus an image in the locations 124 may be reduced or avoided.

Thus, with the information projector system 106, the information 112 may be displayed on the exterior surface 116 of the aircraft 104 in a dynamic fashion. In other words, the images 114 displayed on the exterior surface 116 of the aircraft 104 may change based on where the aircraft 104 is located, the status of the aircraft 104, and other suitable factors. This change may be to have a different image or an animation of an image, or the images may be displayed sequentially to provide a video.

By changing the images 114, the information projector system 106 may perform a number of different functions. These different functions may provide more flexibility than placing or painting logos or messages on the exterior surface 116 of the aircraft 104.

For example, a logo, display, and/or tail number of the aircraft 104 may be displayed, while the aircraft 104 is moving on a taxiway, runway, taking off, or in flight. In other situations, the information projector system 106 may project status information, maintenance information, safety information, and/or other information for or about the aircraft 104 in the images 114 in the displays 118 on the exterior surface 116 of the aircraft 104 when the aircraft 104 is on the ground for maintenance or other operations.

In this manner, the information projector system 106 may display the information 112 in the images 114 on the exterior surface 116 of the aircraft 104 with increased flexibility and in a manner that may reduce concerns with other types of display devices, such as liquid crystal display devices and organic light emitting diode devices.

The illustration of the information display environment 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, although the display control system 109 is shown as a separate component from the computer system 108, in some illustrative examples, the display control system 109 may be part of the computer system 108. In still other illustrative examples, the display module 111 may be located in each of the display units 110 rather than in the computer system 108.

As another example, the computer system 108 may be located in another location remote to the number of the display units 110. For example, the computer system 108 may be located at a dispatcher, an airport, or another location that may be in communication with the display units 110 in the aircraft 104. With this type of configuration, the display units 110 may communicate with the computer system 108 through wireless communications links. As a result, components in the information projector system 106 may be distributed in other locations other than the aircraft 104.

The illustration of the display units 110 are not meant to limit how many display units may be used. In some examples, only a single display unit may be present in the information projector system 106.

Figure 2:
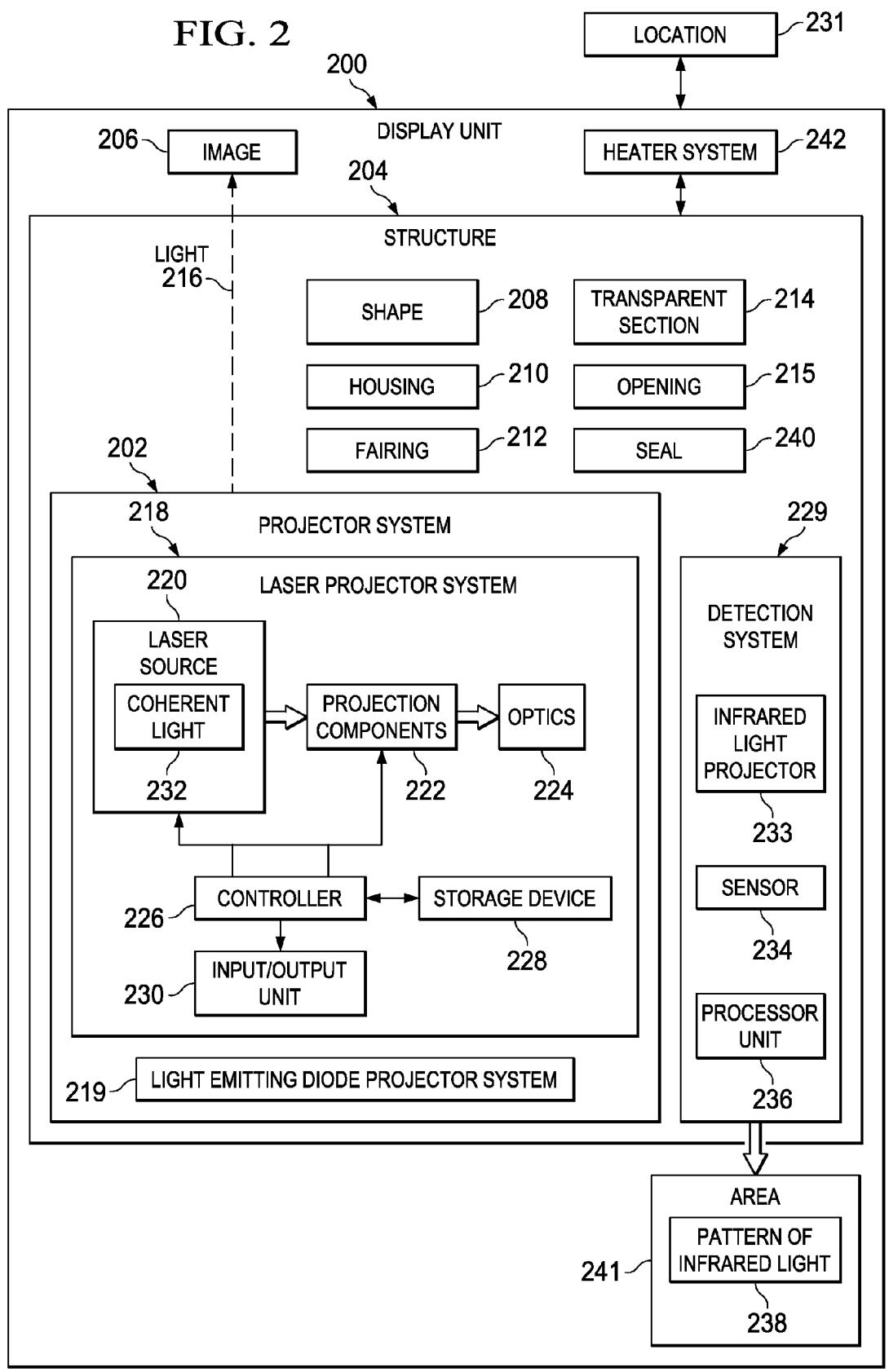
FIG. 2 is an illustration of a block diagram of a display unit in accordance with an advantageous embodiment.

With reference now to FIG. 2, an illustration of a block diagram of a display unit is depicted in accordance with an advantageous embodiment. A display unit 200 is an example of a display unit within the display units 110 in FIG. 1. As depicted, the display unit 200 may replace existing lights on an aircraft.

In these illustrative examples, the display unit 200 comprises a projector system 202 and a structure 204. The projector system 202 is configured to project an image 206 onto the exterior surface 116 of the aircraft 104 in FIG. 1.

The projector system 202 is connected to the structure 204. The structure 204 is configured to be connected to the aircraft 104. The structure 204 may be configured to protect the projector system 202 from the environment around the aircraft 104 during flight. In these examples, the structure 204 may be configured to replace a similar structure that contains a light assembly on the aircraft 104.

Further, the structure 204 has a shape 208 that is configured to reduce the undesired airflow 122 that may be caused when the aircraft 104 is in flight. In particular, the shape 208 of the structure 204 may be used to reduce the undesired airflow 122 during flight that may be caused by the projector system 202 or other components if those components were not covered by the structure 204.

The structure 204, in some illustrative examples, takes the form of a housing 210 and holds the projector system 202 inside of the housing 210. The housing 210 may take the form of a fairing 212 to hold or cover the projector system 202. The housing 210 may be substantially flush to the exterior surface 116, located above the exterior surface 116, or located below the exterior surface 116 of the aircraft 104 in FIG. 1.

The structure 204 also includes a transparent section 214 and/or an opening 215. The transparent section 214 and the opening 215 are configured to pass light 216 from the projector system 202 onto a location on the aircraft 104.

In these illustrative examples, the structure 204 may be constructed from a material that is suitable for mounting the projector system 202 and withstanding the environmental conditions around the aircraft 104 during flight. These environmental conditions may include, for example, without limitation, temperature, pressure, moisture, impacts, and/or other conditions that may be present during the operation of the aircraft 104. Other factors that may be taken into account in selecting materials for the structure 204 include, for example, without limitation, strength, weight, maintenance needs, coefficient of expansion, and/or other suitable factors.

Further, the housing 210 may provide a seal 240. The seal 240 may be, for example, a hermitic seal. The seal 240 may be configured to prevent, or at least reduce, liquids or vapors from entering the interior of the housing 210 where the projector system 202 and other components may be located. As a result, the seal 240 may reduce exposure of the projector system 202 to the environment and protect the projector system 202 from the environment around the aircraft 104 during flight.

In these illustrative examples, the projector system 202 may comprise at least one of a laser projector system 218, a light emitting diode projector system 219, and/or other suitable types of projector systems. The type of projector system selected depends on the needs and the uses for the display unit 200.

As depicted, the laser projector system 218 may be implemented using any suitable type of laser projector system. The laser projector system 218 may be a system that employs the diffraction, filtering, and/or scanning to display the image 206. For example, the laser projector system 218 may be implemented using holographic laser projection technology.

Of course, any other type or number of light projector systems may be used in the projector system 202 that is configured to display the image 206 on the exterior surface 116 of the aircraft 104. The selection of components in the projector system 202 may include selecting the components that produce at least one of a desired quality for the image 206 at different distances or angles. The quality of the image 206 may be measured by the amount of speckle in the image 206.

Further, the projector system 202 may be selected as one that provides a desired quality for the image 206 with a desired throw angle. The throw angle represents the angle at which light exiting the projector aperture diverges. The display unit 200 with larger throw angles are able to generate a larger projected image for a given distance from the image plane. For example, a desired throw angle may be about 90 degrees or greater for holographic laser projection technology.

In these illustrative examples, the laser projector system 218 comprises a laser source 220, projection components 222, optics 224, a controller 226, a storage device 228, and an input/output unit 230.

The laser source 220 generates coherent light 232. The projection components 222 control the coherent light 232 to form the image 206. For example, the projection components 222 may control the projection of the coherent light 232 to form a pattern on the exterior surface 116 to display the image 206 in the displays 118. The coherent light 232 passes through the optics 224 for projection onto the exterior surface 116 of the aircraft 104.

In these illustrative examples, the laser source 220 may have more than one laser unit. For example, the laser source 220 may have a red laser unit, a green laser unit, and a blue laser unit. Of course, other numbers of laser units and/or colors may be used in the laser source 220, depending on the implementation.

The controller 226 controls the operation of the laser source 220 and the projection components 222 to display the image 206 in a desired fashion. The controller 226 is a hardware component that may be implemented using an application specific integrated circuit, a processor unit, a central processing unit, and other suitable types of hardware.

In these illustrative examples, the information 112 needed to generate and display the image 206 may be stored in the storage device 228. For example, the information 112 may be a message that is to be displayed in the image 206. In still other examples, the information 112 may be the image 206. The storage device 228 may take a number of different forms. The storage device 228 may be a hard drive, a memory, or a combination of these and other suitable components.

In still other illustrative examples, the information 112 may be received for use by the controller 226 through the input/output unit 230. The input/output unit 230 may take a number of different forms. For example, the input/output unit 230 may be at least one of a network interface card, a serial port, a universal serial bus connector, and other suitable types of devices that may be used to provide communications to the controller 226.

In these illustrative examples, if the display unit 200 is connected to a moveable structure on the aircraft 104, the projector system 202 may include a detection system 229 to compensate for this movement. For example, the display unit 200 may be mounted on a horizontal stabilizer of the aircraft 104. In this location, the display unit 200 may display the image 206 onto the exterior surface 116 of a vertical stabilizer on the aircraft 104. Movement of the horizontal stabilizer may distort and/or change the focus of the image 206 in an undesirable manner.

The detection system 229 is configured to identify changes in a location 231 of the display unit 200 and change the display of the image 206. The change is such that the image 206 does not change in its presentation on the exterior surface 116 of the vertical stabilizer on the aircraft 104 in an undesired manner.

In these illustrative examples, the detection system 229 comprises an infrared light projector 233, a sensor 234, and a processor unit 236. The infrared light projector 233 may project a pattern of infrared light 238 in an area 241 onto the exterior surface 116 of the aircraft 104.

The sensor 234 may detect a change in the pattern of infrared light 238 when the location 231 of the display unit 200 changes. The change in the location 231 of the display unit 200 may be described with a number of parameters. These parameters may include, for example, without limitation, an angle, a distance, and/or other suitable parameters.

The processor unit 236 may identify this change and send a signal to the controller 226 in the laser projector system 218. The controller 226 may control the projection components 222 in a manner that maintains a desired display of the image 206. As a result, distortions and/or changes that may be caused by the movement of the display unit 200 may be reduced.

The detection system 229 also may be used to increase eye safety. For example, the detection system 229 may display the pattern of infrared light 238 in a manner that provides for increased safety in using the display unit 200. The pattern of infrared light 238 may be displayed in a perimeter, an area, and/or other form so that movement of an object is detected by the sensor 234. The object may be a person, a bird, or some other object. The pattern of infrared light 238 may be such that the movement of the object into the pattern of infrared light 238 is detected before the object moves into the coherent light 232.

When movement is detected by the sensor 234 in the detection system 229, a signal may be sent to the controller 226. In response to this signal, the controller 226 may turn off the laser source 220 in the laser projector system 218.

Another response may be to stop projecting the coherent light 232 in the area in which the object is detected. For example, the detection system 229 may be configured to detect a presence of the object in a path or beam of the light 216 projected to form the image 206 and to change the projection of the light 216 to avoid hitting the object with the light 216. As a result, a portion of the image 206 may not be displayed, while other portions of the image 206 remain displayed.

In this manner, increased safety may be present for personnel or other people that may move too close or into the laser source 220. In this manner, inadvertent contact with the eye of an operator by the laser source 220 may be avoided.

Further, in some illustrative examples, the projector system 202 may not operate as desired when temperatures are reduced outside of a temperature range for which the projector system 202 was designed. For example, if the temperature decreases from those on the ground to those in flight at a cruising altitude, the projector system may not function as desired.

With these types of conditions, the display unit 200 also may include a heater system 242. The heater system 242 may be located within and/or connected to the structure 204. The heater system 242 is configured to generate heat in a manner that provides a desired operating temperature for the projector system 202. Of course, other components also may be included, depending on the environmental conditions and the operating ranges for the display unit 200. For example, a cooling system may be used, depending on the temperature range in which the projector system 202 operates.

In this manner, information is displayed on an exterior surface 116 of aircraft 104. An image in images 114 is displayed using a display unit in display units 110. The image is capable of being projected on exterior surface 116 of aircraft 104 during any phase of operation of aircraft 104 using one of more of the advantageous embodiments.

The illustration of the information display environment 100 in FIG. 1 and example components for the display unit 200 in FIG. 2 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, the detection system 229 may not be present in the display unit 200. In other illustrative examples, the detection system 229 may be implemented using systems other than the infrared light projector 233 and the sensor 234. For example, the detection system 229 may be implemented using any hardware that may be configured to detect movement, a presence of an object, or a combination of the two. For example, the detection system 229 may be implemented using one or more cameras with pattern recognition software. In still other illustrative examples, the display unit 200 may be integrated as part of the aircraft 104 when the aircraft 104 is manufactured.

Figure 3:
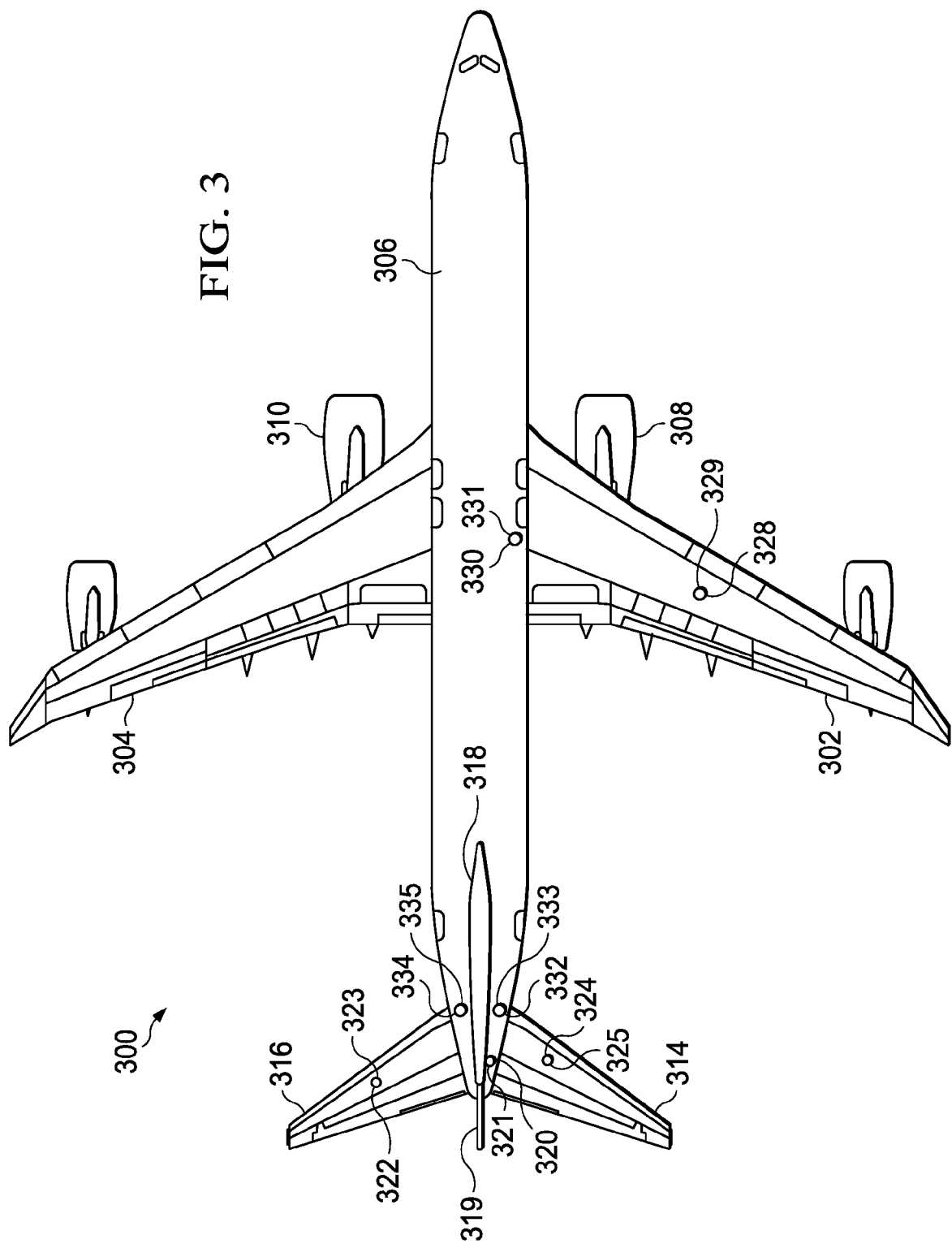
FIG. 3 is an illustration of an aircraft in accordance with an advantageous embodiment.

With reference now to FIG. 3, an illustration of an aircraft is depicted in accordance with an advantageous embodiment. In this illustrative example, aircraft 300 is depicted as a physical example of one implementation for the aircraft 104 shown in block form in FIG. 1.

As depicted, the aircraft 300 has wings 302 and 304 connected to a fuselage 306. The aircraft 300 also includes engines 308 and 310. A horizontal stabilizer 314, a horizontal stabilizer 316, and a vertical stabilizer 318 are connected to a tail section 319 of the fuselage 306.

In these illustrative examples, the information projector system 106 depicted in FIG. 1 may be implemented in a physical form on the aircraft 300. For example, display units 321, 323, and 325 are physical examples of one implementation for the display units 110 in FIG. 1. These display units 321, 323, and 325 may be placed in different locations on the aircraft 300. In one example, the display unit 321 may be placed in a location 320 on the fuselage 306, and the display unit 323 may be placed in a location 322 on the horizontal stabilizer 316. As another example, the display unit 325 may be placed in a location 324 on the horizontal stabilizer 314. The display units 321, 323, and 325 are examples of the display units 110 in FIG. 1 and may be implemented using the display unit 200 in FIG. 2.

At the locations 320, 322, and 324, the respective display units 321, 323, and 325 may display the image 206 from FIG. 2 on the vertical stabilizer 318.

As another example, a display unit 329 may be placed in a location 328 on the wing 302. At the location 328, the display unit 329 may project the image 206 onto the engine 308 to form a display. As yet another example, a display unit 331 may be placed at a location 330. When the display unit 331 is at the location 330, the display unit 331 may project the image 206 onto the wing 302.

Display units 333 and 335 may be placed at locations 332 and 334, respectively. In these locations, the display units 333 and 335 may display the image 206 on the bottom of the horizontal stabilizer 314 and the horizontal stabilizer 316, respectively. The display units 329, 331, 333, and 335 are examples of the display units 110 in FIG. 1 and may be implemented using the display unit 200 in FIG. 2.

In these illustrative examples, the locations 322, 324, and 330 are located on the top side of the aircraft 300. The locations 328, 332, and 334 are on the bottom side of the aircraft 300.

Figure 4:
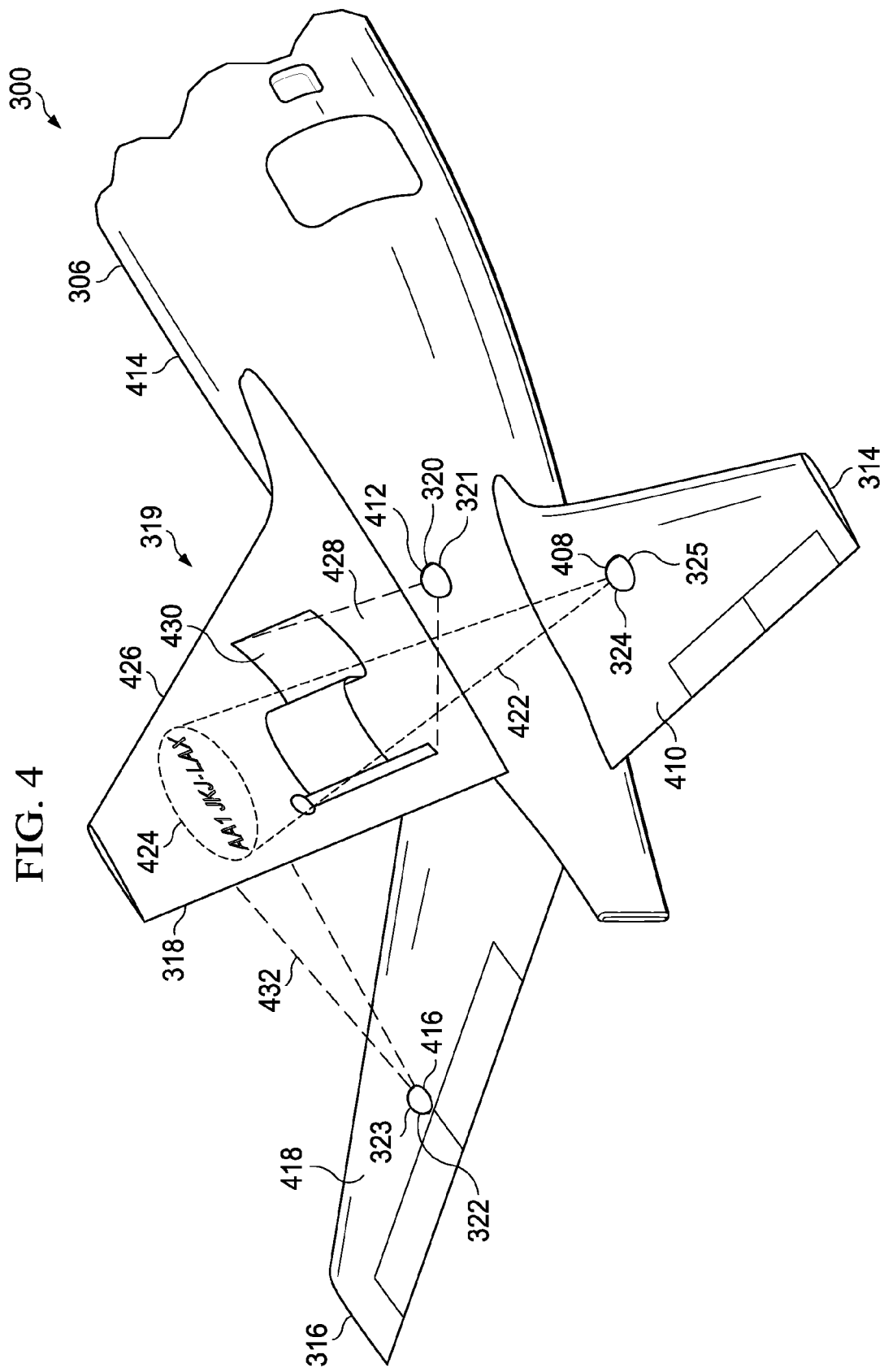
FIG. 4 is an illustration of the tail section of an aircraft in accordance with an advantageous embodiment.

Turning to FIG. 4, an illustration of the tail section 319 of the aircraft 300 in FIG. 3 is depicted in accordance with an advantageous embodiment. In this illustrative example, the display unit 325 is shown in the location 324 on the horizontal stabilizer 314. The display unit 321 is shown on the fuselage 306 in the location 320. The display unit 323 is at the location 322 on the horizontal stabilizer 316.

In this illustrative example, the display unit 325 and the display unit 321 are mounted and located in a moveable section of the aircraft 300. The display unit 325 has a housing 408 in the form of a fairing that is attached to an exterior surface 410 of the horizontal stabilizer 314. In a similar fashion, the display unit 321 has a housing 412 attached to an exterior surface 414 of the fuselage 306.

As another illustrative example, the display unit 323 has a housing 416 that is substantially flush to an exterior surface 418 of the horizontal stabilizer 316. As a result, the housing 416 is connected to a moveable portion of the horizontal stabilizer 316.

As depicted in these illustrative examples, the display unit 325 projects a light 422 to display an image 424 onto an exterior surface 426 of the vertical stabilizer 318. The light 422 may be, for example, a beam of light that is defracted or filtered to display the image 424, or may be a scanner to display the image 424. In this particular example, the image 424 includes a tail number for the aircraft 300.

In a similar fashion, the display unit 321 projects a light 428 to display an image 430 on the exterior surface 426 of the vertical stabilizer 318. As depicted, the image 430 is a flag. In this illustrative example, the flag in the image 430 may be static or may be dynamic. For example, the image 430 may be projected to show the flag moving as if the wind was passing through the flag projected in the image 430.

As another illustrative example, the display unit 323 projects light 432 to display an image (not shown). This image also is displayed on the exterior surface 426 of the vertical stabilizer 318.

In these illustrative examples, these images may be still images or moving images. In other words, the images 424 and 430 may be animated, such as one generated by a computer, or may include video. The images 424 and 430 may change, depending on the particular location of the aircraft 300, the phase of flight of the aircraft 300, whether the aircraft 300 is in maintenance or in service, and/or based on other conditions or parameters.

Figure 5:
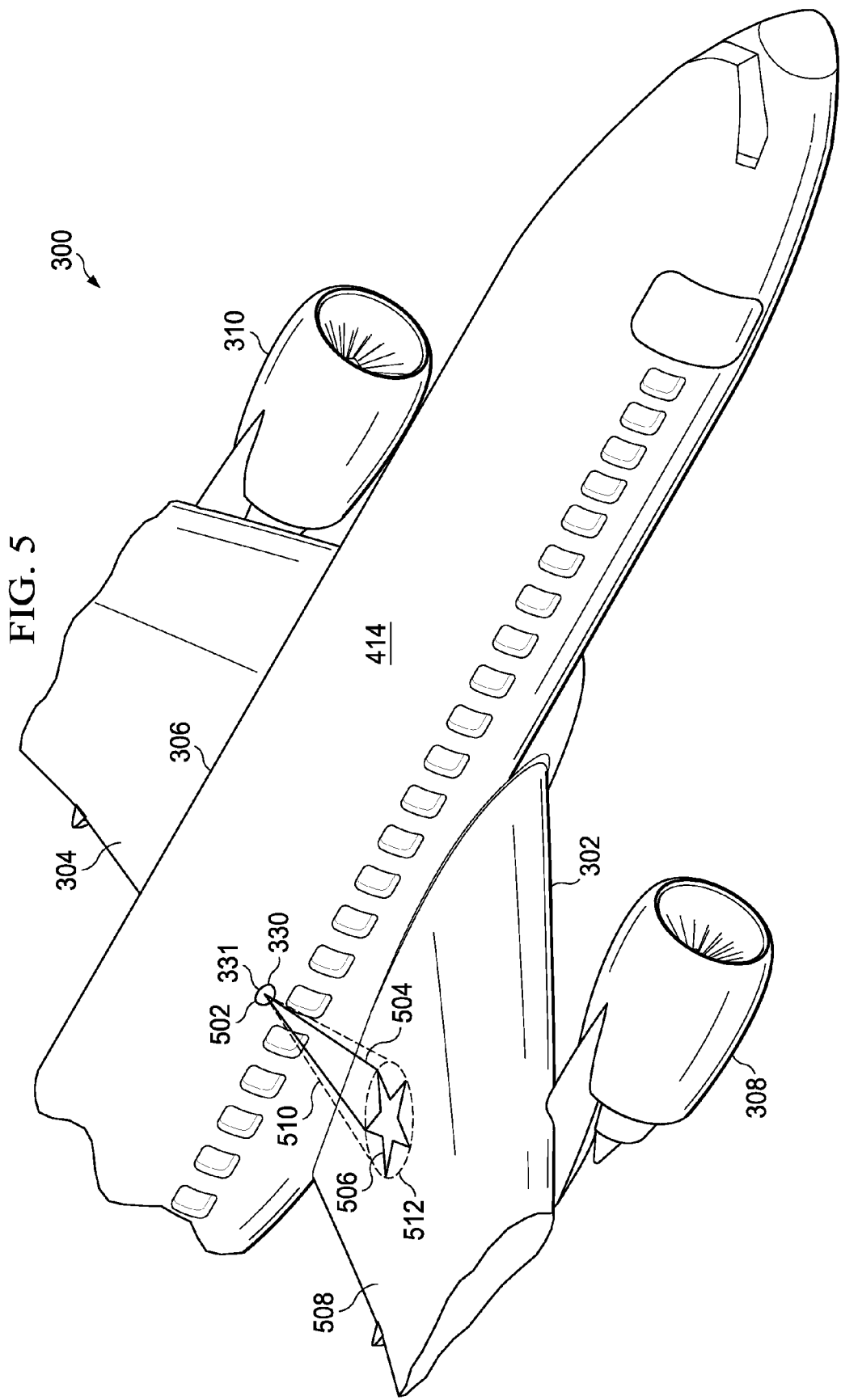
FIG. 5 is an illustration of another portion of an aircraft in accordance with an advantageous embodiment.

With reference now to FIG. 5, an illustration of another portion of the aircraft 300 in FIG. 3 is depicted in accordance with an advantageous embodiment. The display unit 331 is located on the fuselage 306 at the location 330.

The display unit 331 comprises a housing 502. The housing 502 is attached to the exterior surface 414 of the fuselage 306 in this illustrative example.

The display unit 331 projects a light 504 to display an image 506 on an exterior surface 508 of the wing 302. Additionally, the display unit 331 also projects a pattern of infrared light 510 into an area 512 onto the exterior surface 508 of the wing 302.

The pattern of infrared light 510 may be used to detect movement of an object that may pass through the light 504 projected by the display unit 331. If movement into the pattern of infrared light 510 is detected, projection of the light 504 may be ceased as a safety feature.

Figure 6:
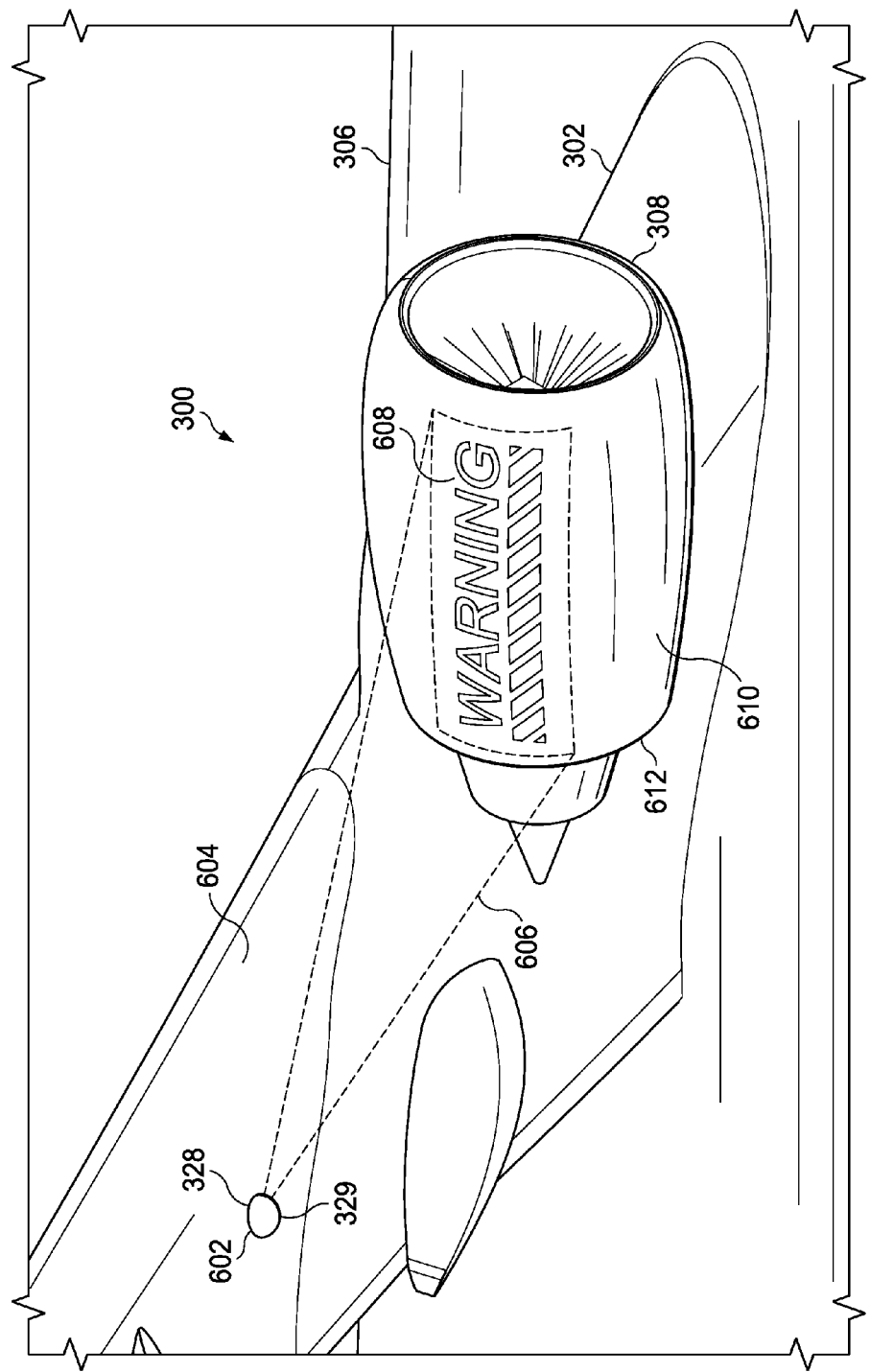
FIG. 6 is an illustration of another portion of an aircraft in accordance with an advantageous embodiment.

Turning now to FIG. 6, an illustration of another portion of the aircraft 300 is depicted in accordance with an advantageous embodiment. The display unit 329 is located on the wing 302 at the location 328.

In this depicted example, a housing 602 of the display unit 329 is connected to the wing 302 of the aircraft 300. In particular, the display unit 329 is connected to an exterior surface 604 on the bottom side of the wing 302. In this illustrative example, the display unit 329 is substantially flush to the exterior surface 604 of the wing 302.

In this illustrative example, the display unit 329 projects a beam of light 606 to display an image 608. In this illustrative example, the image 608 is displayed on an exterior surface 610 of a nacelle 612 of the engine 308.

The image 608 takes the form of information that may be used by maintenance or other personnel when the aircraft 300 is on the ground. In this example, the image 608 is a warning that the engine 308 is about to start, warming up, or otherwise operating. The projection of the image 608 may be made in a manner that is conspicuous or attention-getting with respect to maintenance personnel. For example, the image 608 may be displayed in a color, it may change color, it may be animated, and/or it may strobe or flash.

In other illustrative examples, the image 608 may include other types of information. This other type of information may include, for example, without limitation, instructions to load or unload cargo, fuel the aircraft, and/or perform other operations.

Further, when the aircraft 300 is on the ground, the image 608 may be projected on the ground to provide information to maintenance personnel. This information may include, for example, an identification of areas that maintenance personnel should stay clear of with respect to the aircraft 300.

Figure 7:
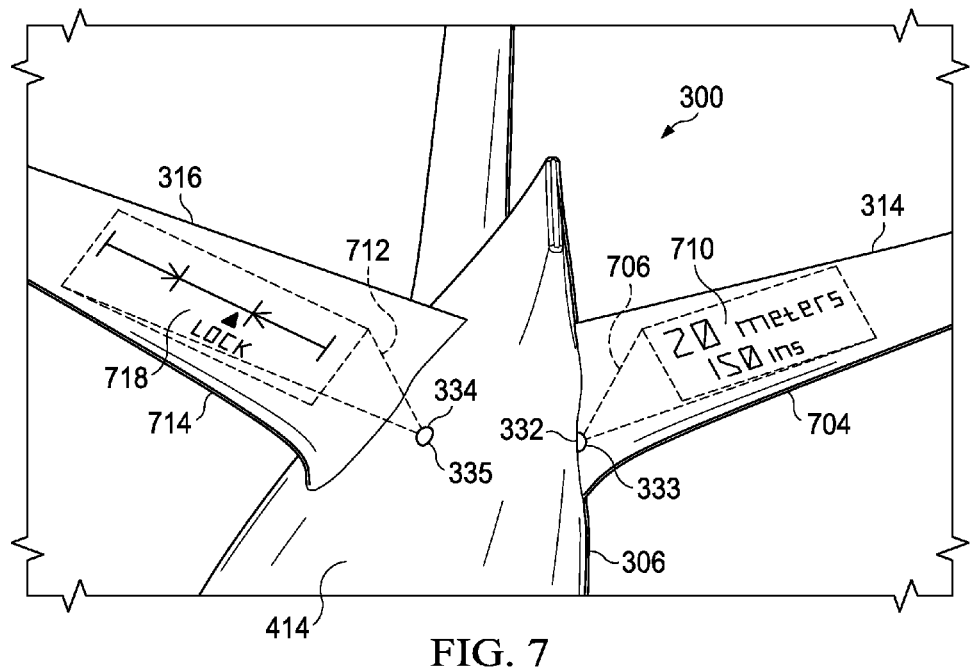
FIG. 7 is an illustration of display units on the exterior surface of a fuselage in accordance with an advantageous embodiment.

With reference to FIG. 7, an illustration of the display units 333 and 335 on the exterior surface 414 of the fuselage 306 is depicted in accordance with an advantageous embodiment. In this illustrative example, the display units 333 and 335 are located on the bottom side of the fuselage 306 at the locations 332 and 334, respectively.

As depicted, the display unit 333 projects a beam of light 706 onto an exterior surface 704 of the horizontal stabilizer 314 of the aircraft 300 to display an image 710. The display unit 335 projects a beam of light 712 onto an exterior surface 714 of the horizontal stabilizer 316 to form an image 718.

In these illustrative examples, the display of the image 710 on the horizontal stabilizer 314 and the display of the image 718 on the horizontal stabilizer 316 provide information for maintenance personnel. For example, the image 710 and the image 718 may be indicators to aid the pilot of an aircraft which is about to be refueled in flight in the precise alignment and guidance of the aircraft during the refueling operation.

The illustrative examples in FIGS. 4-7 depict images being displayed on the exterior surface of an aircraft during different phases of operation of the aircraft. These phases may include, for example, without limitation, take off, level flight, landing, taxing, refueling, and other suitable phases of operation.

Figure 8:
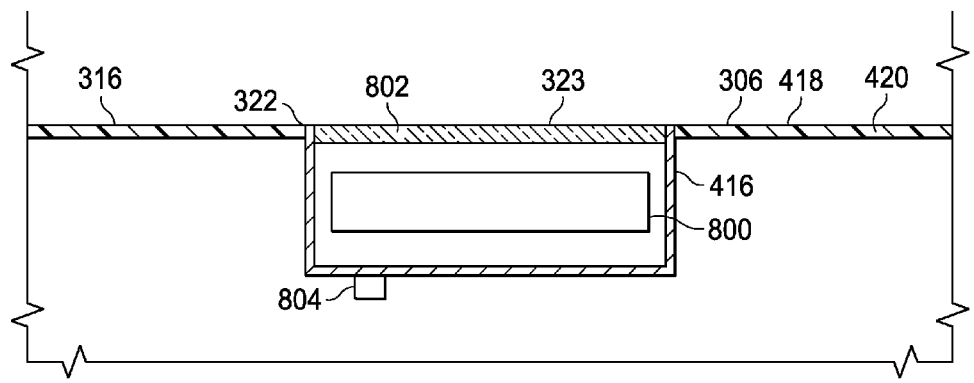
FIG. 8 is a cross-sectional view of a display unit connected to a horizontal stabilizer in accordance with an advantageous embodiment.

With reference now to FIG. 8, a cross-sectional view of the display unit 323 connected to the horizontal stabilizer 316 is depicted in accordance with an advantageous embodiment. As depicted, the display unit 323 is substantially flush to the exterior surface 418 of the horizontal stabilizer 316.

In this illustrative example, a projector system 800 is located inside of the housing 416 of the display unit 323. As can be seen, the housing 416 also includes a cover 802, which is substantially flush to the exterior surface 418.

Additionally, a power connector 804 also is seen extending from the housing 416 of the display unit 323.

Figure 9:
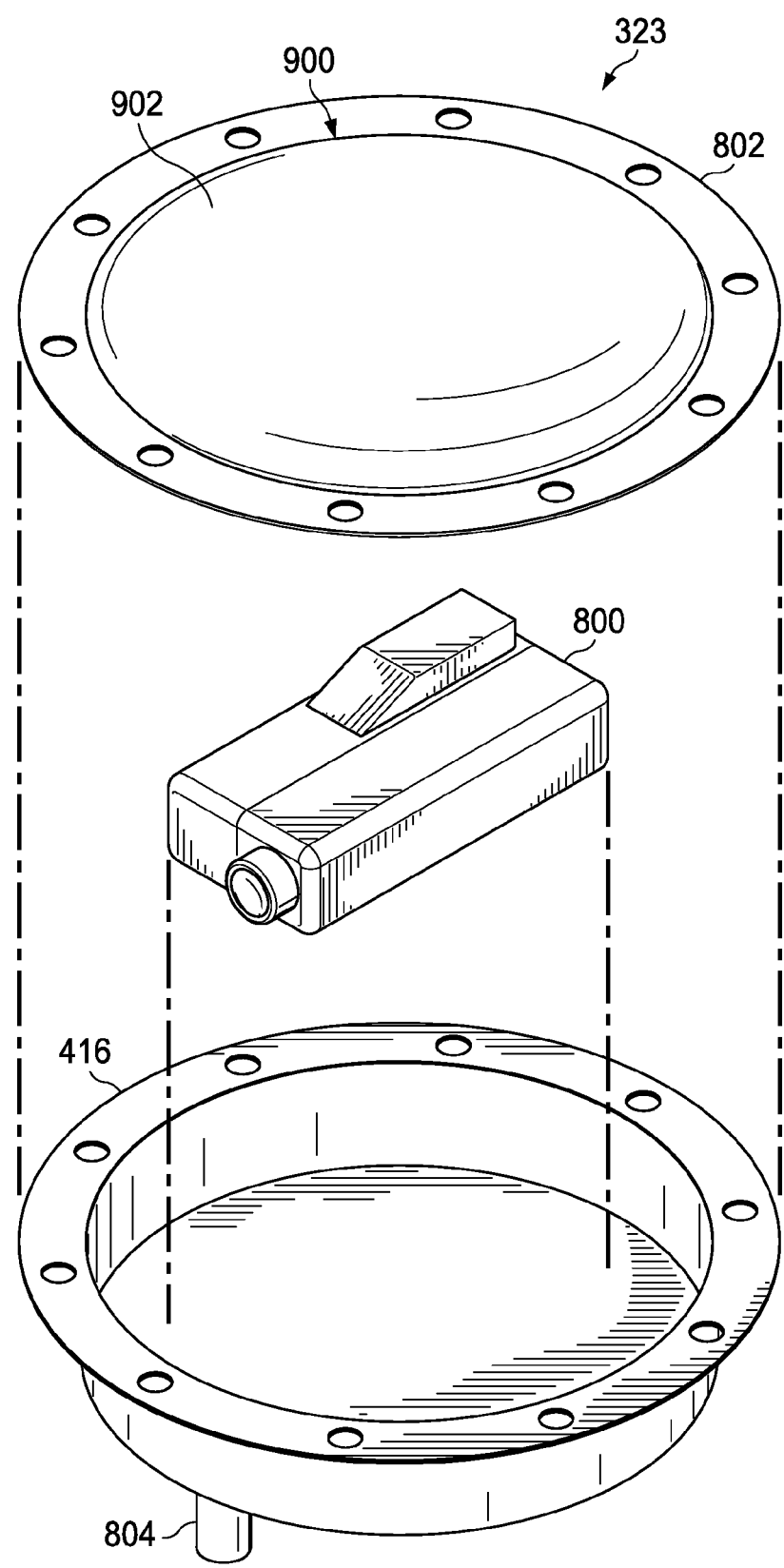
FIG. 9 is an illustration of an exploded perspective view of a display unit in accordance with an advantageous embodiment.

Turning now to FIG. 9, an exploded perspective view of the display unit 323 is depicted in accordance with an advantageous embodiment. In this illustrative example, a transparent section 900 takes the form of a protective lens 902.

In these illustrative examples, the display of the images may be used to supplement graphics or artwork that is painted on and/or otherwise applied to the exterior surface of the aircraft 300.

Figure 10:
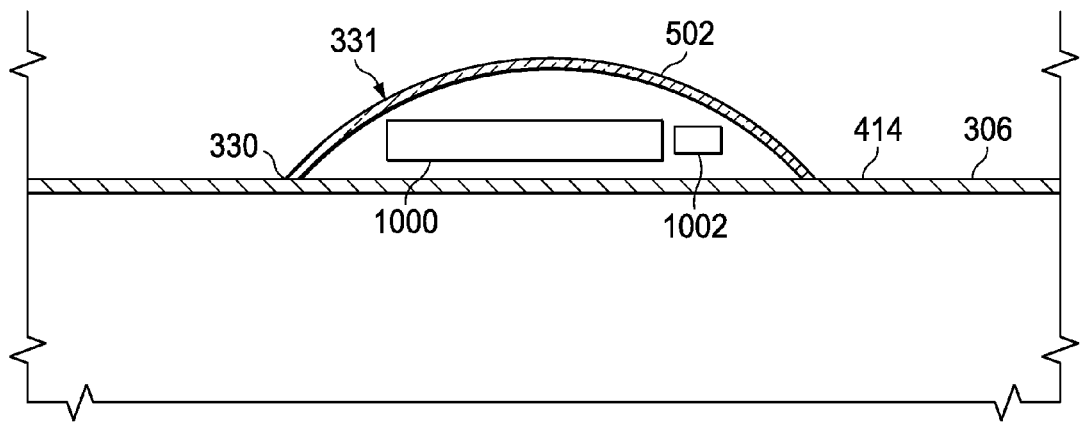
FIG. 10 is an illustration of a display unit on the surface of an aircraft in accordance with an advantageous embodiment.

In FIG. 10, an illustration of a display unit on the surface of an aircraft is depicted in accordance with an advantageous embodiment. In this illustrative example, a cross-sectional view of the display unit 331 is depicted in accordance with an advantageous embodiment.

As depicted, the housing 502 of the display unit 331 is connected to the exterior surface 414 of the fuselage 306. In this illustrative example, a projector system 1000 and a detection system 1002 are seen inside of the housing 502 of the display unit 331. The housing 502 has a shape that is selected to reduce the undesired airflow 122 in FIG. 1.

The illustration of the different locations for the display units 110 from FIG. 1 in FIGS. 3-10 is only meant as some examples of locations where the display units 110 may be placed on the aircraft 300.

Further, the locations on which the different images are displayed in these figures are also only meant as illustrations of where and what type of information may be displayed in the images. The different components illustrated in FIGS. 3-10 may be combined with components in FIG. 1 and in FIG. 2, used with components in FIG. 1 and FIG. 2, or a combination of the two. Additionally, some of the components in these figures are illustrative examples of how the components shown in block form in FIGS. 1 and 2 can be implemented as physical structures.

Further, the illustration of the aircraft 300 and the different display units on the aircraft 300 is only an illustration of one possible implementation for the aircraft 104 in FIG. 1 and some possible implementations for the display unit 200 in FIG. 2 for the aircraft 104. These illustrations are not meant to imply limitations to the manner in which other physical implementations of the aircraft 104 and the display unit 200 may be implemented.

Also, in other illustrative examples, the display units 110 may be located in other locations other than the ones depicted in FIGS. 3-10. As another example, in some illustrative examples, only one or two of the display units 110 may be present rather than the ones illustrated in these figures.

The display units 110 may be located on other portions of the aircraft 300 than those shown. For example, a display unit may be located on the nose of the fuselage 306. This display unit may display an image onto the ground in front of the aircraft rather than on the aircraft. In this manner, information may be provided for ground crew members, depending on the particular implementation.

Figure 11:
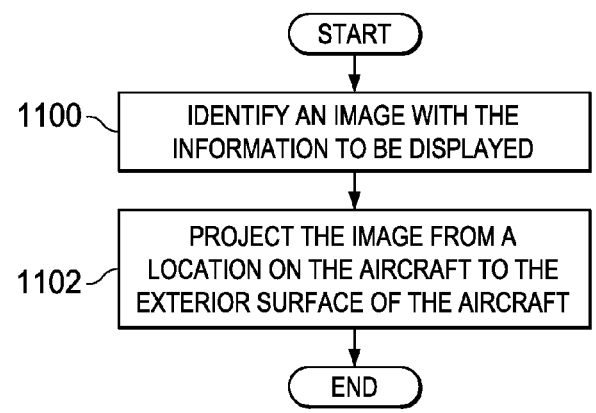
FIG. 11 is an illustration of a flowchart of a process for displaying information on the exterior surface of an aircraft in accordance with an advantageous embodiment.

With reference now to FIG. 11, an illustration of a flowchart of a process for displaying information on the exterior surface 116 of the aircraft 104 in FIG. 1 is depicted in accordance with an advantageous embodiment. The process illustrated in this example may be implemented in the display unit 200 in FIG. 2.

The process begins by identifying the image 206 with the information 112 to be displayed (operation 1100). The process then projects the image 206 from a location on the aircraft 104 to the exterior surface 116 of the aircraft 104 (operation 1102), with the process terminating thereafter. Of course, in some illustrative examples, the projection of the image from a location on the aircraft may be to a surface on the ground adjacent to or near the aircraft 104. The projection of the image 206 is performed using the projector system 202 connected to the structure 204. The structure 204 is configured to be connected to the aircraft 104 and has the shape 208 configured to reduce the undesired airflow 122 that may occur when the aircraft 104 is in flight.

Figure 12:
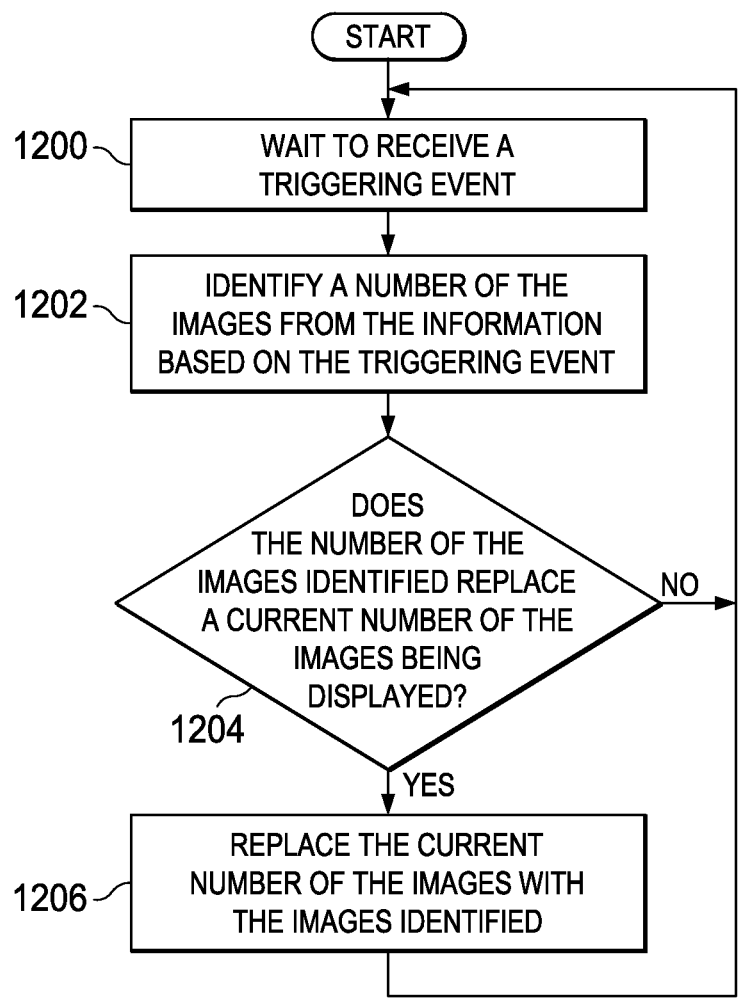
FIG. 12 is an illustration of a flowchart of a process for selecting an image using information in accordance with an advantageous embodiment.

Turning next to FIG. 12, an illustration of a flowchart of a process for selecting the image 206 in FIG. 2 using the information 112 in FIG. 1 is depicted in accordance with an advantageous embodiment. The process illustrated in FIG. 12 may be implemented in the display module 111 in the computer system 108 in FIG. 1.

The process begins by waiting to receive a triggering event (operation 1200). The triggering event may be a triggering event in the triggering events 120 in FIG. 1. When a triggering event is received, the process identifies a number of the images 114 from the information 112 based on the triggering event (operation 1202). The identification of the number of the images 114 depends on the triggering event in these illustrative examples.

For example, the number of the images 114 selected may be based on a phase of flight for the aircraft 104. If the aircraft 104 is on the taxiway, the number of the images 114 may include a logo. If the aircraft 104 is at the gate and maintenance is being performed for the next flight, the number of the images 114 may include maintenance information. Also, the number of the images 114 also may be based on the location of the aircraft 104.

For example, the number of the images 114 may include a logo for a city at which the aircraft 104 is located. As yet another example, the number of the images 114 may be selected to include advertisements based on the city, time of year, weather, and other events that may be occurring, as identified by the triggering event that is received. The number of the images 114 may be an image that is to be projected from each of the number of the display units 110, or the number of the images 114 may be a sequence of the images 114 for an animation or video, some combination thereof, or other suitable types of images.

Thereafter, a determination is made as to whether the number of the images 114 identified replaces a current number of the images 114 being displayed (operation 1204). If the number of the images 114 replaces the current number of the images 114, the current number of the images 114 is replaced with the images identified (operation 1206), with the process then returning to operation 1200.

With reference again to operation 1204, if the number of the images 114 identified is the same as the current number of the images 114, the process returns to operation 1200.

Figure 13:
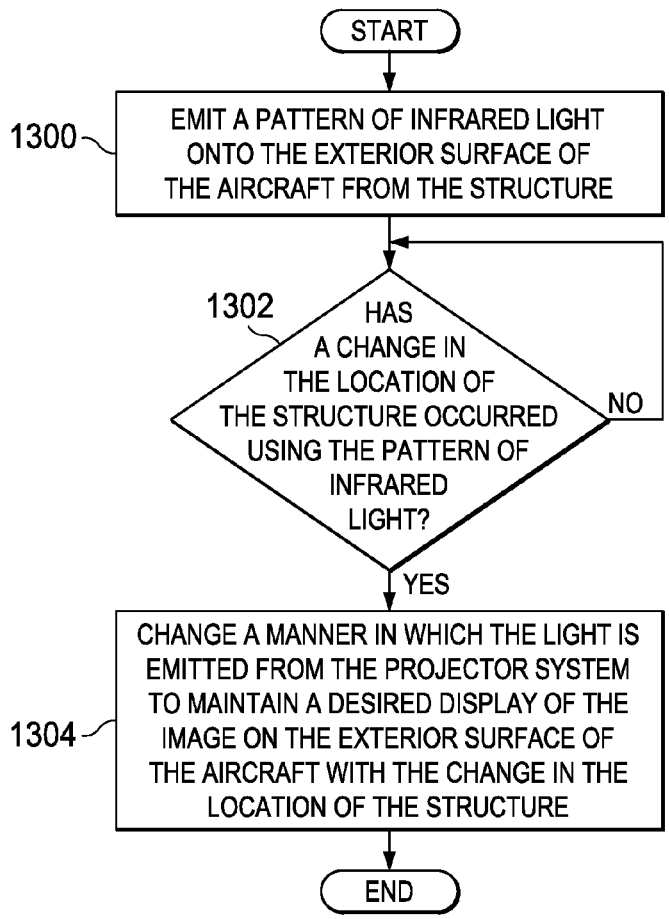
FIG. 13 is an illustration of a flowchart of a process for adjusting projection of an image in accordance with an advantageous embodiment.

With reference now to FIG. 13, an illustration of a flowchart of a process for adjusting projection of the image 206 in FIG. 2 is depicted in accordance with an advantageous embodiment. The process illustrated in this example may be implemented in the display unit 200 in FIG. 2.

The process begins by emitting the pattern of infrared light 238 onto the exterior surface 116 of the aircraft 104 from the structure 204 (operation 1300). The process then determines whether a change in the location of the structure 204 has occurred using the pattern of infrared light 238 (operation 1302).

If a change is detected, the process changes a manner in which the light 216 is emitted from the projector system 202 to maintain a desired display of the image 206 on the exterior surface 116 of the aircraft 104 with the change in the location of the structure 204 (operation 1304), with the process terminating thereafter.

With reference again to operation 1302, if a change in the location of the structure 204 is not detected, the process returns to operation 1302.

Figure 14:
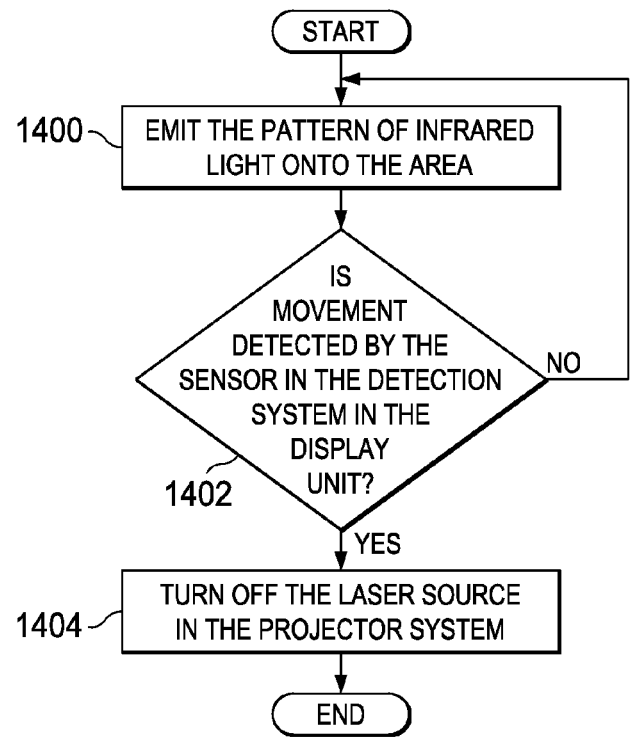
FIG. 14 is an illustration of a flowchart of a process for turning off a display unit in accordance with an advantageous embodiment.

With reference now to FIG. 14, an illustration of a flowchart of a process for turning off the display unit 200 is depicted in accordance with an advantageous embodiment. The process illustrated in FIG. 14 may be implemented in the display unit 200 in FIG. 2.

The process begins by emitting the pattern of infrared light 510 onto the area 512 (operation 1400). A determination is made as to whether movement is detected by the sensor 234 in the detection system 229 in the display unit 200 (operation 1402). In operation 1402, the movement detected is for an object that may move in front of the light displayed by the display unit 331. Movement in operation 1402 may be detected based on different parameters. For example, the movement may be considered to be detected if the movement is less than a selected speed. Further, operation 1402 may be configured to not consider a shadow, light, rain, or other objects that are not considered to be a person as movement.

If movement is detected, the process turns off the laser source 220 in the projector system 202 (operation 1404). The process terminates thereafter.

With reference again to operation 1402, if movement is not detected by the sensor 234, the process returns to operation 1400 as described above.

The flowcharts and block diagrams in the different depicted embodiments illustrate the architecture, functionality, and operation of some possible implementations of apparatus and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Turning now to FIG. 15, an illustration of a data processing system is depicted in accordance with an advantageous embodiment. In this illustrative example, data processing system 1500 includes a communications fabric 1502, which provides communications between a processor unit 1504, memory 1506, persistent storage 1508, communications unit 1510, input/output (I/O) unit 1512, and a display 1514. The data processing system 1500 is an example of a data processing system that may be used to implement one or more of the computers in the computer system 108 in FIG. 1.

The processor unit 1504 serves to execute instructions for software that may be loaded into the memory 1506. The processor unit 1504 may be a number of processors, a multi-processor core, or some other type of processor, depending on the particular implementation. A number, as used herein with reference to an item, means one or more items. Further, the processor unit 1504 may be implemented using a number of heterogeneous processor systems in which a main processor is present with secondary processors on a single chip. As another illustrative example, the processor unit 1504 may be a symmetric multi-processor system containing multiple processors of the same type.

The memory 1506 and the persistent storage 1508 are examples of storage devices 1516. A storage device is any piece of hardware that is capable of storing information, such as, for example, without limitation, data, program code in functional form, and/or other suitable information, either on a temporary basis and/or a permanent basis. The storage devices 1516 may also be referred to as computer readable storage devices in these examples. The memory 1506, in these examples, may be, for example, a random access memory or any other suitable volatile or non-volatile storage device. The persistent storage 1508 may take various forms, depending on the particular implementation.

For example, the persistent storage 1508 may contain one or more components or devices. For example, the persistent storage 1508 may be a hard drive, a flash memory, a rewritable optical disk, a rewritable magnetic tape, or some combination of the above. The media used by the persistent storage 1508 also may be removable. For example, a removable hard drive may be used for the persistent storage 1508.

The communications unit 1510, in these examples, provides for communications with other data processing systems or devices. In these examples, the communications unit 1510 is a network interface card. The communications unit 1510 may provide communications through the use of either or both physical and wireless communications links.

The input/output unit 1512 allows for input and output of data with other devices that may be connected to the data processing system 1500. For example, the input/output unit 1512 may provide a connection for user input through a keyboard, a mouse, and/or some other suitable input device. Further, the input/output unit 1512 may send output to a printer. The display 1514 provides a mechanism to display information to a user.

Instructions for the operating system, applications, and/or programs may be located in the storage devices 1516, which are in communication with the processor unit 1504 through the communications fabric 1502. In these illustrative examples, the instructions are in a functional form on the persistent storage 1508. These instructions may be loaded into the memory 1506 for execution by the processor unit 1504. The processes of the different embodiments may be performed by the processor unit 1504 using computer-implemented instructions, which may be located in a memory, such as the memory 1506.

These instructions are referred to as program code, computer usable program code, or computer readable program code that may be read and executed by a processor in the processor unit 1504. The program code in the different embodiments may be embodied on different physical or computer readable storage media, such as the memory 1506 or the persistent storage 1508.

Program code 1518 is located in a functional form on computer readable media 1520 that is selectively removable and may be loaded onto or transferred to the data processing system 1500 for execution by the processor unit 1504. The program code 1518 and the computer readable media 1520 form computer program product 1522 in these examples. In one example, the computer readable media 1520 may be computer readable storage media 1524 or computer readable signal media 1526. The computer readable storage media 1524 may include, for example, an optical or magnetic disk that is inserted or placed into a drive or other device that is part of the persistent storage 1508 for transfer onto a storage device, such as a hard drive, that is part of the persistent storage 1508.

The computer readable storage media 1524 also may take the form of a persistent storage, such as a hard drive, a thumb drive, or a flash memory, that is connected to the data processing system 1500. In some instances, the computer readable storage media 1524 may not be removable from the data processing system 1500. In these examples, the computer readable storage media 1524 is a physical or tangible storage device used to store the program code 1518 rather than a medium that propagates or transmits the program code 1518. The computer readable storage media 1524 is also referred to as a computer readable tangible storage device or a computer readable physical storage device.

Alternatively, the program code 1518 may be transferred to the data processing system 1500 using the computer readable signal media 1526. The computer readable signal media 1526 may be, for example, a propagated data signal containing the program code 1518. For example, the computer readable signal media 1526 may be an electromagnetic signal and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, the program code 1518 may be downloaded over a network to the persistent storage 1508 from another device or data processing system through the computer readable signal media 1526 for use within the data processing system 1500. For instance, program code stored in a computer readable storage medium in a server data processing system may be downloaded over a network from the server to the data processing system 1500. The data processing system providing the program code 1518 may be a server computer, a client computer, or some other device capable of storing and transmitting the program code 1518.

The different components illustrated for the data processing system 1500 are not meant to provide architectural limitations to the manner in which different embodiments may be implemented. The different advantageous embodiments may be implemented in a data processing system including components in addition to or in place of those illustrated for the data processing system 1500. Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, the processor unit 1504 may take the form of a hardware unit that has circuits that are manufactured or configured for a particular use. This type of hardware may perform operations without needing program code to be loaded into a memory from a storage device to be configured to perform the operations.

For example, when the processor unit 1504 takes the form of a hardware unit, the processor unit 1504 may be a circuit system, an application specific integrated circuit (ASIC), a programmable logic device (PLD), or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array (FPGA), and other suitable hardware devices. With this type of implementation, the program code 1518 may be omitted, because the processes for the different embodiments are implemented in a hardware unit.

In still another illustrative example, the processor unit 1504 may be implemented using a combination of processors found in computers and hardware units. The processor unit 1504 may have a number of hardware units and a number of processors that are configured to run the program code 1518. With this depicted example, some of the processes may be implemented in the number of hardware units, while other processes may be implemented in the number of processors.

In another example, a bus system may be used to implement the communications fabric 1502 and may be comprised of one or more buses, such as a system bus or an input/output bus. Of course, the bus system may be implemented using any suitable type of architecture that provides for a transfer of data between different components or devices attached to the bus system.

Thus, the different advantageous embodiments provide a method and apparatus for projecting the images 114 onto the exterior surface 116 of the aircraft 104. The different advantageous embodiments employ the information projector system 106 in FIG. 1 in which the information projector system 106 is configured to project the images 114 onto the exterior surface 116 of the aircraft 104. The information projector system 106 is comprised of the number of the display units 110. The display unit 200 in FIG. 2 includes at least the projector system 202 and the structure 204. The structure 204 is configured to be connected to the aircraft 104 and has the shape 208 that is configured to reduce the undesired airflow 122 when the aircraft 104 is in flight.

With one or more of the different advantageous embodiments, the information 112 may be displayed in the images 114 on the exterior surface 116 of the aircraft 104. One or more of the images 114 may be changed at different times to provide the information 112 that may be relevant or desired for a particular situation or location of the aircraft 104. In this manner, logos and other information may be changed for the aircraft 104, depending on the phase of flight, location, or other status of the aircraft 104. For example, a logo or advertisement may be in the number of the images 114. Further, safety and maintenance information also may be present in the information 112 that is displayed in the images 114. As an example, a warning of an engine start may be present in the images 114, a hazard location, and other information may be displayed in the images 114 on the exterior surface 116 of the aircraft 104 in various locations 124.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. An apparatus comprising:
a projector system configured to project an image on an exterior surface of an airplane comprising a first moveable structure,
   wherein the projector system comprises a display unit connected to the first moveable structure on the airplane, and
   wherein the projector system includes a detection system configured to determine a movement of the first moveable structure on the airplane and to compensate for the movement by changing a manner in which light is emitted from the display unit.

2. The apparatus of claim 1, wherein:
the display unit further comprises a second structure connected to the projector system, wherein the second structure is connected to the airplane and has a shape configured to reduce an undesired airflow caused by the projector system when the airplane is in flight;
the projector system is configured to project the image with a desired quality and a desired throw angle;
the projector system comprises a display control system configured to align the image on the exterior surface of the airplane;
the second structure comprises a housing configured to hold the projector system;
the housing is configured to protect the projector system from an environment around the airplane during flight; and
the housing is a fairing substantially flush with or located above the exterior surface of the airplane.

3. The apparatus of claim 2, wherein:
the projector system is a laser projector system; and
the housing is associated with a horizontal stabilizer of the airplane, wherein the horizontal stabilizer of the airplane is the first moveable structure, and wherein the laser projector system is configured to display the image on the vertical stabilizer of the airplane.

4. The apparatus of claim 3, wherein the fairing is located within the first moveable structure and wherein the second structure further has a transparent section that is configured to pass light from the laser projector system onto the vertical stabilizer.

5. The apparatus of claim 4, wherein the second structure further comprises:
a cover for an opening in the horizontal stabilizer, wherein the transparent section is in a location on the cover.

6. The apparatus of claim 2, wherein the fairing is configured to be connected to the exterior surface of the airplane, wherein the fairing has the shape configured to reduce the undesired airflow and aerodynamic drag.

7. The apparatus of claim 3 further wherein:
the detection system is configured to detect a change in a location of the housing, wherein the laser projector system is configured to change the manner in which the light is emitted from the display unit to maintain the desired display of the image on the vertical stabilizer of the jet airplane.

8. The apparatus of claim 1 further wherein:
the detection system is configured to detect a presence of a person in a beam of light projected to form the image and to change a projection of the beam of light to avoid the person.

9. The apparatus of claim 2 further comprising:
a heater system configured to generate heat for the projector system; and
wherein a hermitic seal is configured to protect the projector system from the environment around the airplane during flight.

10. The apparatus of claim 1, wherein:
the projector system is configured to project the image based on a triggering event; and
the image changes to form a change, wherein the change is based on a location of the airplane or a status of the airplane and wherein the change is from the image to a different image, a video, or an animation of the image.

11. A method for displaying information on an exterior surface of an aircraft with a first moveable structure, the method comprising:
projecting an image using a display unit, wherein the display unit comprises a projector system and is connected to the first moveable structure on the aircraft;
determining the movement of the first moveable structure on the aircraft using a detection system associated with the projector system; and
compensating for the movement using the detection system by changing in a manner in which light is emitted from the display unit and by maintaining a desired display of the image on the exterior surface of the aircraft during the movement of the first moveable structure on the aircraft.

12. The method of claim 11 further comprising:
emitting a pattern of infrared light onto the exterior surface of the aircraft from the first moveable structure, wherein the determining the movement of the first moveable structure uses the pattern of infrared light;
aligning the image on the exterior surface of the aircraft;
protecting the projector system from an environment around the aircraft;
wherein the image is projected with a desired quality and a desired throw angle;
wherein the changing of the manner in which the light is emitted from the display unit is to perform the maintaining of the desired display of the image on the exterior surface of the aircraft during the movement of the first moveable structure;
wherein the changing of the manner in which the light is emitted from the display unit is responsive to the movement of the first moveable structure; and
wherein the aircraft is a jet airplane comprising two fixed wings, a fuselage, at least two engines, a horizontal stabilizer connected to a tail section of the fuselage, and a vertical stabilizer connected to the tail section of the fuselage.

13. The method of claim 12, wherein:
the projector system comprises a laser projector system;
the display unit comprises a second structure connected to the jet airplane;
the second structure comprises a housing configured to hold the laser projector system and configured to be associated with the horizontal stabilizer of the jet airplane;
the horizontal stabilizer of the jet airplane is the first moveable structure; and
the housing is a fairing substantially flush with or located above the exterior of the jet airplane;

the housing further provides a hermitic seal configured to protect the projector system from the environment around the jet airplane; and the laser projector system is configured to display the image on the vertical stabilizer of the jet airplane.

14. The method of claim 13, wherein the fairing is located within the first moveable structure and wherein the second structure further has a transparent section that is configured to pass the light from the laser projector system onto the vertical stabilizer.

15. The method of claim 14, wherein the second structure further comprises a cover for an opening in the horizontal stabilizer, wherein the transparent section is in a location on the cover and wherein the second structure has a shape configured to reduce an undesired airflow caused by the display unit when the aircraft is in flight.

16. The method of claim 13, wherein the fairing is configured to be connected to the exterior surface of the aircraft, wherein the fairing has a shape configured to reduce an undesired airflow.

17. The method of claim 11 further comprising:

a heater system configured to generate heat for a laser projector system.

18. The method of claim 11, wherein:

the projector system is configured to project the image based on a triggering event; and the image changes to form a change, wherein the change is based on a location of the aircraft or a status of the aircraft and wherein the change is from the image to a different image, a video, or an animation of the image.

19. An airplane comprising:

a projector system configured to project an image on an exterior surface of the airplane, wherein the projector system comprises a display unit connected to a first structure on the airplane, wherein the first structure on the airplane is subject to a movement, wherein the projector system includes a detection system configured to determine the movement of the first structure on the airplane and to compensate for the movement by changing a manner in which light is emitted from the display unit.

20. The apparatus of claim 1 wherein:

the image comprises a focused image;

the first movable structure on the airplane is subject to a movement that tends to distort a focus of the focused image; and the projector system compensates for the movement by maintaining a desired display of the focused image on the exterior surface of the airplane during the movement of the first movable structure on the airplane.

* * * * *